US006792600B1

(12) United States Patent
Blandy

(10) Patent No.: US 6,792,600 B1
(45) Date of Patent: Sep. 14, 2004

(54) METHOD AND APPARATUS FOR JUST IN TIME COMPILATION OF INSTRUCTIONS

(75) Inventor: Geoffrey Owen Blandy, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 992 days.

(21) Appl. No.: 09/078,933

(22) Filed: May 14, 1998

(51) Int. Cl.[7] ............................................. G06F 9/45
(52) U.S. Cl. ................ 717/140; 717/131; 717/136; 717/139; 717/127
(58) Field of Search ...................... 395/707, 702, 395/709, 705; 717/5, 127–131, 136, 139, 140

(56) References Cited

U.S. PATENT DOCUMENTS

| | | | |
|---|---|---|---|
| 4,695,977 A | * 9/1987 | Hansen et al. | 379/93.14 |
| 4,747,127 A | * 5/1988 | Hansen et al. | 379/93.14 |
| 5,210,837 A | * 5/1993 | Wiecek | 395/702 |
| 5,784,553 A | * 7/1998 | Kolawa et al. | 714/38 |
| 5,848,274 A | * 12/1998 | Hamby et al. | 395/705 |
| 5,889,999 A | * 3/1999 | Breternitz, Jr. et al. | 395/709 |
| 5,938,760 A | * 8/1999 | Levine et al. | 712/220 |
| 5,943,687 A | * 8/1999 | Liedberg | 711/156 |
| 5,987,256 A | * 11/1999 | Wu et al. | 717/7 |
| 6,006,033 A | * 12/1999 | Heisch | 717/9 |
| 6,044,220 A | 3/2000 | Breternitz, Jr. | 395/705 |
| 6,233,733 B1 | * 5/2001 | Ghosh | 717/118 |
| 6,240,548 B1 | * 5/2001 | Holzle et al. | 717/140 |

OTHER PUBLICATIONS

Title: Java Bytecode to Native Code Translation: The Caffeine Prototype and Preliminary Results, author: Hsieh et al, IEEE, 1996.*
Title: Java as a Specification Language for Hardware–Software Systems, author: Helaihel et al, IEEE, 1997.*
An:97:278366, Title: Hava Battleground: Virtual Machine, author: Moeller, Michael, Source: P week, 19th May, 1997.*
An: 98:522515, Title: Java compilers take diverse paths to market, Author: Cole, Bernard, source: Electronic Engineering Times, Oct. 12, 1998.*
An: 96: 89491, Title: Small Talk Solutions'96 Conference, Source: Computer International, Mar. 15, 1996.*
An: 406005, Title: Sun Reveals First Java Processor Core, Source: Microprocessor Report, Oct. 28, 1996.*
An: 9725787, Title: Java Processors balance power and cost, Source: Electronic Engineering Times, (Jan. 13, 1997).*

* cited by examiner

Primary Examiner—Ohameli C. Das
(74) Attorney, Agent, or Firm—Duke W. Yee; Jeffrey S. LaBaw

(57) ABSTRACT

A method and apparatus provides a process in a data processing system for executing a method having a plurality of paths. The data processing system executes native machine code. A path is identified within the method that is being executed, wherein a plurality of bytecodes are associated with the path. Bytecodes are compiled for the path being executed, wherein the bytecodes are compiled into native machine code, wherein bytecodes for unexecuted paths remain uncompiled.

29 Claims, 11 Drawing Sheets

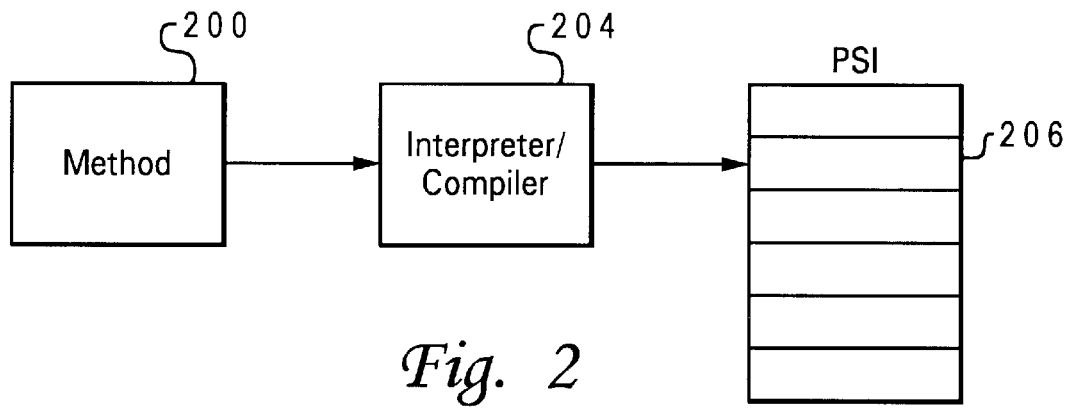
Fig. 2
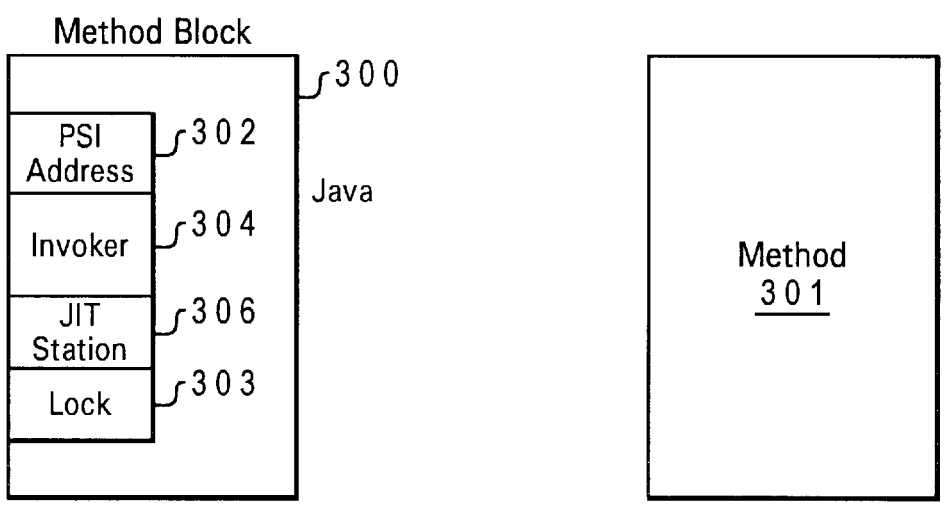
Fig. 3A
Fig. 3B

METHOD AND APPARATUS FOR JUST IN TIME COMPILATION OF INSTRUCTIONS

BACKGROUND OF THE INVENTION

1. Technical Field

The present invention relates generally to an improved data processing system and in particular to a method and apparatus for compiling instructions in a data processing system. Still more particularly, the present invention relates to a method and apparatus for just in time compilation of instructions in a data processing system.

2. Description of Related Art

In a procedural environment, the developer often writes an application by making a series of calls to library routines provided by the system (as well as to routines written by the developer). Conceptually, the developer's code sits on top of the system code. The developer's code can access all of the system's services, but the system need know nothing about the developer's code as they are insulated from one another by one or more API layers. The developer is responsible for providing the overall behavior and flow of control of the application, with the system providing at least some of the functionality.

The procedural approach (and its more disciplined offspring, structured programming) has produced major improvements in the quality of software over the last twenty years. However, its limitations are painfully apparent in the difficulty in extending and specializing functionality. Since procedural systems do not provide flexible interfaces, developers cannot selectively change or extend the structure or behavior.

Even when extensions and modifications are made in a procedural application, it is hard to ensure that the changes will interoperate correctly with other systems that depend on the modifications. A typical result is that the solutions from one developer might not have anything in common with any other developer's solutions. Instead of a small team of experts solving a particular problem once, there are numerous teams repeatedly and unsatisfactorily (at least insofar as interoperability) addressing the same problem.

With the minimal reuse of code in a procedural system, maintenance requirements increase due to the greater amount of coding involved and the subsequent increased potential for introducing new bugs. This lack of extensibility, factorability, interoperability, and maintainability adds up to lower code and design reuse. The result is that developer productivity is severely hindered since more time and resources are spent writing code instead of solving new problems.

On the other hand, object-oriented environments solve many of the problems associated with procedural programming. Unlike procedural programming environments, which emphasize algorithms and procedures, object oriented environments emphasize the binding of data structures with the methods to operate on the data. The idea is to design object classes that correspond to the essential features of a problem. Object oriented programming includes inheritance, which allows derivation new classes from existing ones to provide special purpose extensions and modifications from a set of common objects available to all developers.

Object oriented environments include, for example, are typically polymorphic in nature, which provides flexibility to create multiple definitions for functions. This feature allows classes to be more general and hence more reusable. Polymorphism also allows new components and functions to be added easily and without disturbing the existing system. Implementing software in object oriented environments makes it possible to design software that is more extensible, reusable, and maintainable.

JAVA is an object oriented programming language and environment that is designed to solve a number of problems in modem programming practice. JAVA is able to support applications for many types of data processing systems, which may contain a variety of central processing units and operating systems architectures. To enable a JAVA application to execute on different types of data processing systems, a compiler typically generates an architecture-neutral file format the compiled code is executable on many processors, given the presence of the JAVA run time system. The JAVA compiler generates bytecode instructions that are non-specific to a particular computer architecture. A bytecode is a machine independent code generated by the JAVA compiler and executed by a JAVA interpreter. A JAVA interpreter is a module that alternatively decodes and executes a bytecode or bytecodes. These bytecode instructions are designed to be easy to interpret on any machine and easily translated on the fly into native machine code.

Just in time (JIT) compilation involves taking bytecodes from the machine independent platform and converting them into machine code that runs on the current platform. Just in time compilation of JAVA bytecodes can provide impressive gains over interpretation in terms of performance. However, invariably, these gains come at the cost of increased storage utilization. Not only is the generated machine code larger than the original bytecode method, but typically the bytecode method is retained for reasons such as debug. Minimizing storage utilization is advantageous for any data processing system and is paramount for data processing systems, such as network computers, which do not employ virtual storage.

Presently available JIT compilers operate during class load or method invocation and compile entire methods. This includes all of the paths within each method whether or not they are used. Additionally, the output, compiled code of presently available JIT compilers are unable to smoothly transition between methods that are compiled through the just in time compiler or jitted and those that are interpreted. This inability to provide smooth transitions leads to jitting more methods than are needed for optimal performance.

Therefore, it would be advantageous to have an improved method and apparatus for JIT compilation of JAVA bytecodes.

SUMMARY OF THE INVENTION

One object of the present invention relates generally to an improved data processing system.

Another object of the present invention relates in particular to a method and apparatus for compiling instructions in a data processing system.

Yet another object of the present invention relates to a method and apparatus for just in time compilation of instructions in a data processing system.

The present invention provides a process in a data processing system for executing a method having a plurality of paths. The data processing system executes native machine code. A path is identified within the method that is being executed, wherein a plurality of bytecodes are associated with the path. Bytecodes are compiled for the path being executed, wherein the bytecodes are compiled into native machine code for the data processing system, wherein bytecodes for unexecuted paths remain uncompiled.

Under the present invention, methods may be partially compiled, leaving infrequently executed paths within the methods in bytecode form, reducing storage use. Compilation of bytecodes as a method is being interpreted resulting in just in time compilation of paths that are actually executed. Bytecodes for a path that is compiled may be used during the same invocation of the method containing the path during which compilation of the bytecodes are being performed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is a block diagram of components used in compiling Java bytecodes as they are interpreted in accordance with a preferred embodiment of the present invention;

FIGS. 3A and 3B are the method blocks in accordance with a preferred embodiment of the present invention;

DETAILED DESCRIPTION OF THE PREFERRED EMBODIMENT

Figure 1:
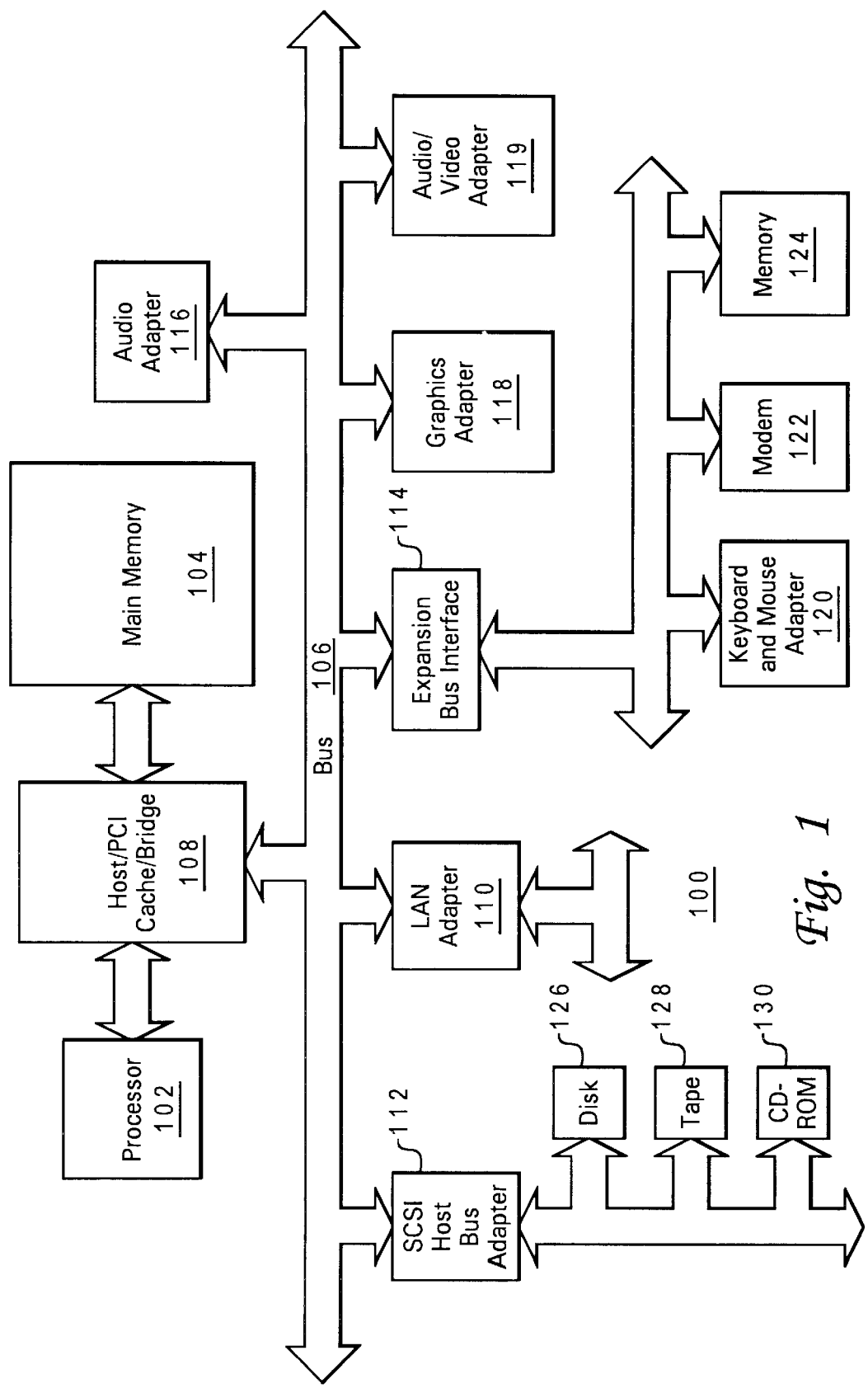
FIG. 1 is a block diagram of a data processing system in which the present invention may be implemented is illustrated.

With reference now to the figures, and in particular with reference to FIG. 1, a block diagram of a data processing system 100 in which the present invention may be implemented is illustrated. Data processing system 100 employs a peripheral component interconnect (PCI) local bus architecture. Although the depicted example employs a PCI bus, other bus architectures such as Micro Channel and ISA may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM 130 in the depicted example. Typical PCI local bus implementations will support three or four PCI expansion slots or add-in connectors. Those of ordinary skill in the art will appreciate that the hardware in FIG. 1 may vary. For example, other peripheral devices, such as optical disk drives and the like may be used in addition to or in place of the hardware depicted in FIG. 1. The depicted example is not meant to imply architectural limitations with respect to the present invention.

In the depicted example, the processes described below may be executed in data processing system 100 in which a JAVA virtual machine is executing. In addition to the embodiment described below, the processes of the present invention are not limited to processing Java bytecodes and may be applied to real time translation of instructions from one environment to another environment.

Turning now to FIG. 2, a block diagram of components used in compiling JAVA bytecodes as they are interpreted is depicted in accordance with a preferred embodiment of the present invention. Method 200 in FIG. 2 is a method containing bytecodes that are being executed. Interpreter/compiler 204 contains the processes and data structures used to interpret and compile the bytecodes within method 200 into machine code or platform specific instructions (PSI) 206 executable by the data processing system. According to the present invention, only paths executed within method 200 are jitted by interpreter/compiler 204. Paths that are unexecuted within method 200 remain in bytecode form. PSI 206 is stored in the order of execution, which provides for improved cache efficiency.

With reference now to FIGS. 3A–3B, a method block and a method is depicted in accordance with a preferred embodiment of the present invention. Method block 300 and method 301 is located in a JAVA virtual machine. Method block 300 includes PSI address 302, lock 303, invoker 304, and ST station 306. Method 301 includes data and processes or routines. PSI address 302 points to the starting address of the compiled codes for the method identified by method block 300. Lock field 303 is employed to lock method 301 as described below. Invoker 304 is a pointer to a routine, which performs the required set up for execution of the method and then causes the execution of the method by branching to the compiled code or by passing control to the interpreter for noncompiled code. Under the present invention, a JAVA method may be in one of four states: an interpret state, a begin RT state, a continued JIT state, and a completed JIT state. In the interpret state, invoker 304 is a pointer to a routine, which performs set up work prior to passing control to the JAVA interpreter. In the begin JIT state, invoker 304 is a pointer to a routine that sets up a JIT station and then passes control to the interpreter/compiler. A JIT station is described in more detail below in reference to FIG. 4. In the completed JIT state, invoker 304 is a pointer to a routine that performs set up and passes control to PSI address 302. The requisite set up involves establishing an appropriate execution environment, which includes invoking and initializing registers in the depicted example. In the continued JIT state, invoker 304 is a pointer to routine that attempts to lock the method and, if successful, passes control the completed JIT state invoker. If the method lock is not available, the process then is directed towards the interpreter. Method block 300 includes a pointer to the bytecodes that are associated with the method. JIT station 306 contains the information needed to compile and interpret bytecodes. JIT station 306 also includes the information needed to continue compilation of unexecuted paths when these paths are executed.

Figure 4:
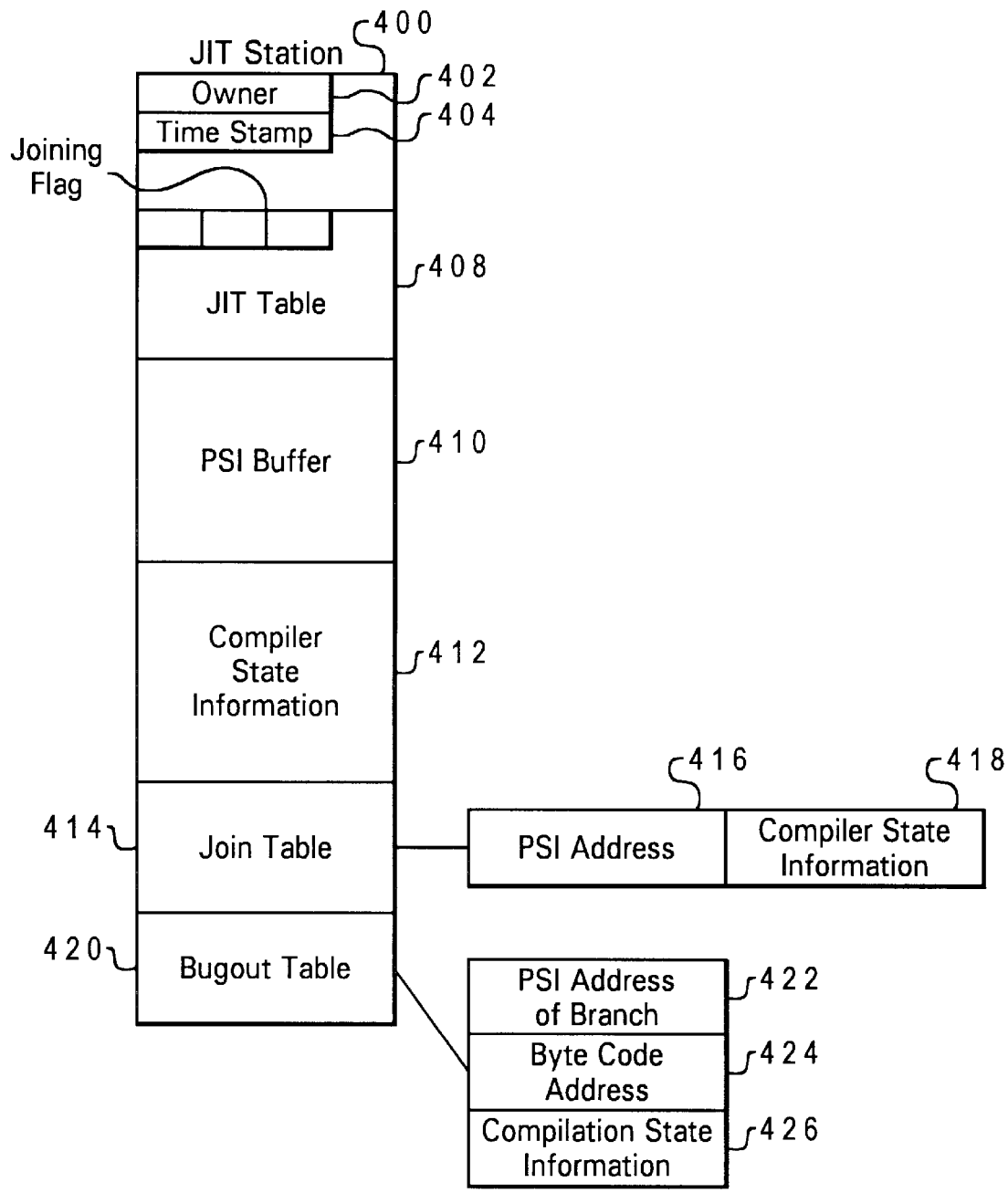
FIG. 4 is a diagram of a JIT station in accordance with a preferred embodiment of the present invention.

Turning now to FIG. 4, a diagram of a JIT station is depicted in accordance with a preferred embodiment of the present invention. One or more JIT stations may be employed under the present invention. In the depicted example, JIT station 400 includes owner field 402, and time stamp field 404. Owner field 402 contains the address of the method currently being jitted. A zero is present in owner field 402 if JIT station 400 is available. JIT station 400 is unavailable when it is being used to actively compile or jit bytecodes. Owner field 402 prevents JIT station 400 from being used by another method when it is in a locked state. Time stamp field 404 is used to determine whether time is up while using the JIT station.

JIT station 400 also includes a JIT table 408, which contains an entry to each instance of a bytecode for a method. In the depicted example, each entry is one byte long, and a bytecode may have more than one byte. A bytecode instruction may consists of a one byte opcode optionally followed by one or more parameter bytes, which results in more than one entry in JIT table 408. Each entry in JIT table 408 indicates whether code joins. If code joins together with other code, a flag is turned on to indicate a join operation, which indicates a requirement for reconciliation of registers used during the compilation process. Each of these entries also indicates whether the code can be visited. In the depicted example, a 1 indicates that only one path exist to the bytecode, a 2 indicates that more than one path to the bytecode, but the bytecode has not yet been compiled. A number greater than two indicates that more than one path exists to the bytecode and that the bytecode has been compiled. Furthermore, the number is an index to the join table.

PSI buffer 410 contains the output, in the form of machine code instructions, from jitting. The instructions may be stored within PSI buffer 410 temporarily until they are stored elsewhere within the data processing system, such as another buffer. Compiler state information 412 includes information, such as the state of the Java stack and the JAVA variables.

Next, join table 414 includes entries that contain PSI address field 416 and compiler state information field 418. PSI address field 416 contains the address of the compiled code. Compiler state information field 418 contains data to reconcile registers used during the compilation process. Bugout table 420 includes entries that contain PSI addresses of conditional branch instructions not yet taken in field 422, target bytecode address field 424, and compilation state information field 426. Each branch in a method that is encountered, but not taken is stored as an entry in bugout table 420. PSI address of branch field 422 contains the address of the branch not taken, while target bytecode address field 424 contains the address of the bytecode, which is the target of the branch not taken. Compilation state information field 426 includes the state of the data processing system at the time the branch was not taken. These entries in bugout table 420 contain the bugout handler information needed to continue compiling bytecodes into machine code.

Figure 5:
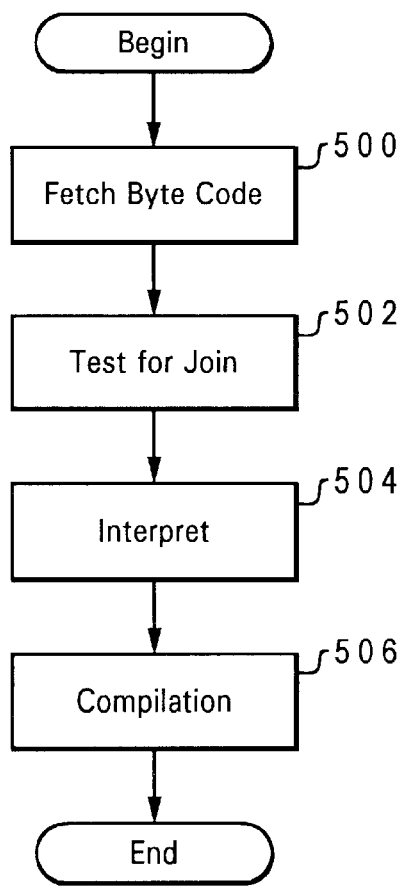
FIG. 5 is a high level flowchart of a process for processing bytecodes in accordance with a preferred embodiment of the present invention.

Turning next to FIG. 5, a high level flowchart of a process for processing bytecodes is depicted in accordance with a preferred embodiment of the present invention. The process begins by fetching a bytecode (step 500). A determination is made as to whether there are multiple paths to this bytecode and taking appropriate action if there are multiple paths (step 502). Step 502 is used to determine whether a join going to the bytecode from other areas or other bytecodes is present. Then, the bytecode is interpreted (step 504) and compiled (step 506).

Figure 6:
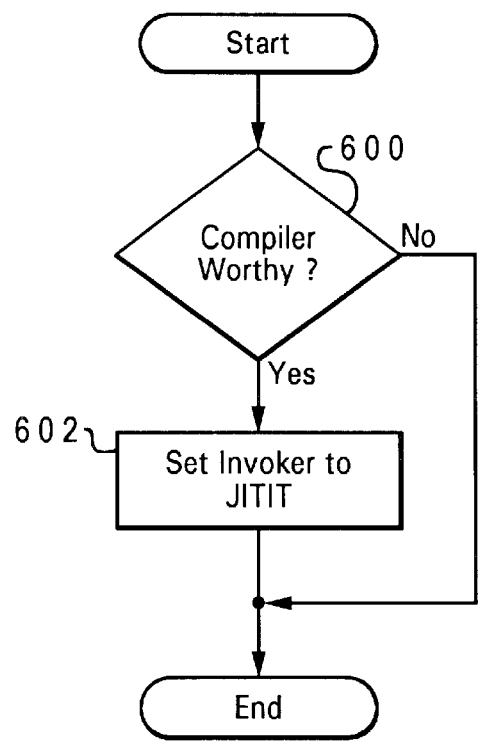
FIG. 6 is a flowchart of a process for determining whether to compile a method in accordance with a preferred embodiment of the present invention.

Turning next to FIG. 6, a flowchart of a process for determining whether to compile a method is depicted in accordance with a preferred embodiment of the present invention. A determination is made as to whether the method is compiler worthy (step 600). For instance, if it has been determined that the method has been executed frequently and recently, the method may be identified as compiler worthy. This step basically determines whether the method should be compiled using the processes of the present invention. If the method is compiler worthy, the invoker is set equal to JITIT (step 602). JITIT the code needed to initialize, setup for, and to carry out interpretation/compilation. JITIT initializes in preparation for interpretation/compilation and actually performs interpretation/compilation.

Figure 7:
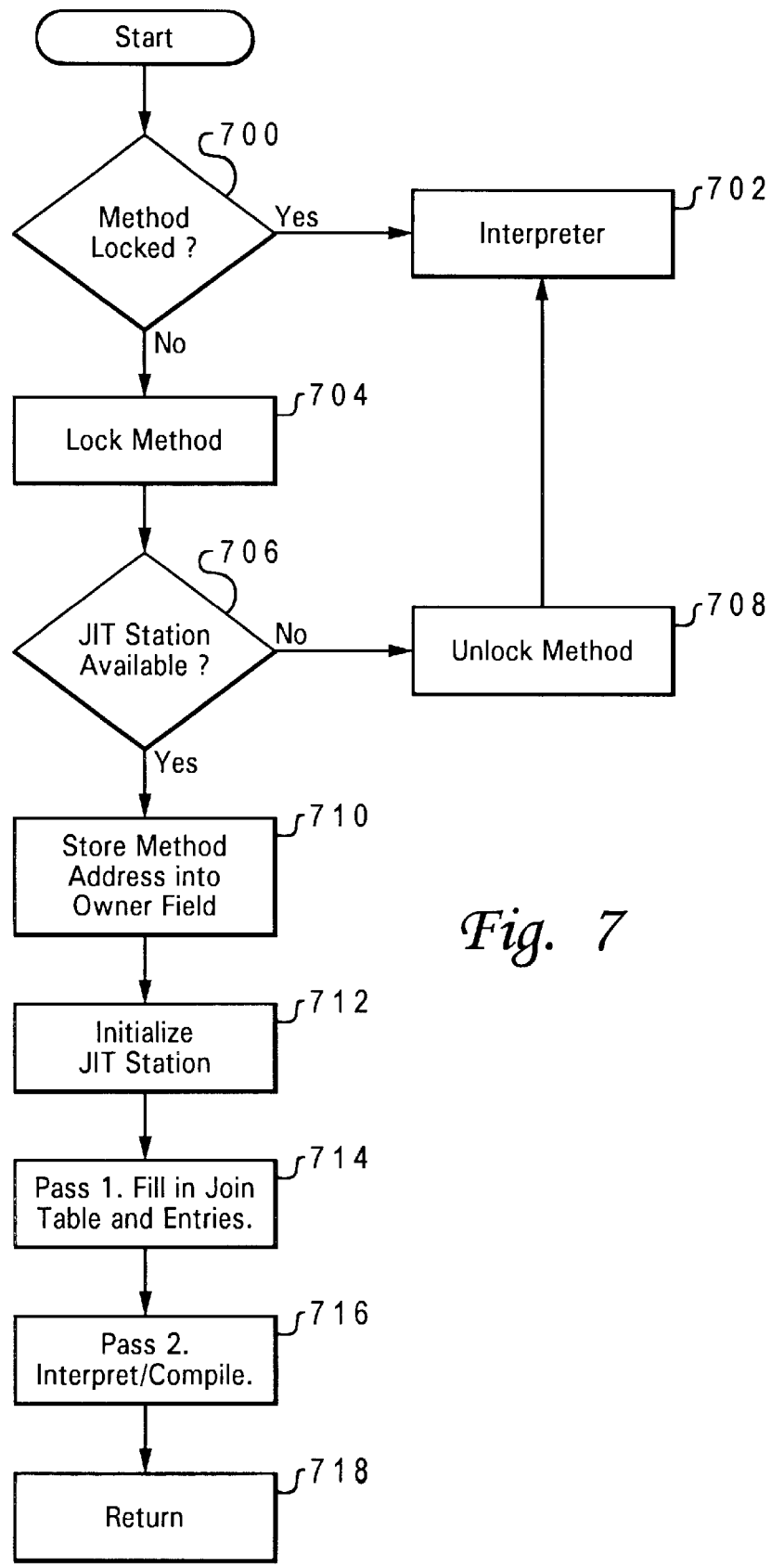
FIG. 7 is a flowchart of a process for processing an invoked method in accordance with a preferred embodiment of the present invention.

With reference now to FIG. 7, a flowchart of a process for processing an invoked method is depicted in accordance with a preferred embodiment of the present invention. The process begins by determining whether the method block is locked (step 700). This determination is made by examining a lock field, such as lock field 303 in method block 300 illustrated in FIG. 3A. The method will be locked if a method is being actively compiled using the JIT station. If the method is locked, the method is processed by the interpreter (step 702). If the method is unlocked, the process then locks the method (step 704). The method is locked using a lock, such as lock field 303 in method block 300 shown in FIG. 3A.

Next, a determination is made as to whether a JIT station is available (step 706). Determining whether a JIT station is available is performed by searching for a JIT station with a zero in the owner field and atomically updating the zero to the address of the current method block. If a JIT station is unavailable, the method is unlocked (step 708), and the process proceeds to step 702 as described above. Otherwise, the method address is stored in the owner field of the JIT station (step 710).

Next, the JIT station is initialized (step 712). Initialization of the JIT station requires zeroing out the join bytes and initializing the bugout table. A first pass, pass 1, is performed, during which join table and other entries in the JIT station are filled (step 714). Next, a second pass, pass 2, occurs. This second pass involves interpreting and compiling paths in the method that is being executed (step 716). The process then returns (step 718).

Figure 8:
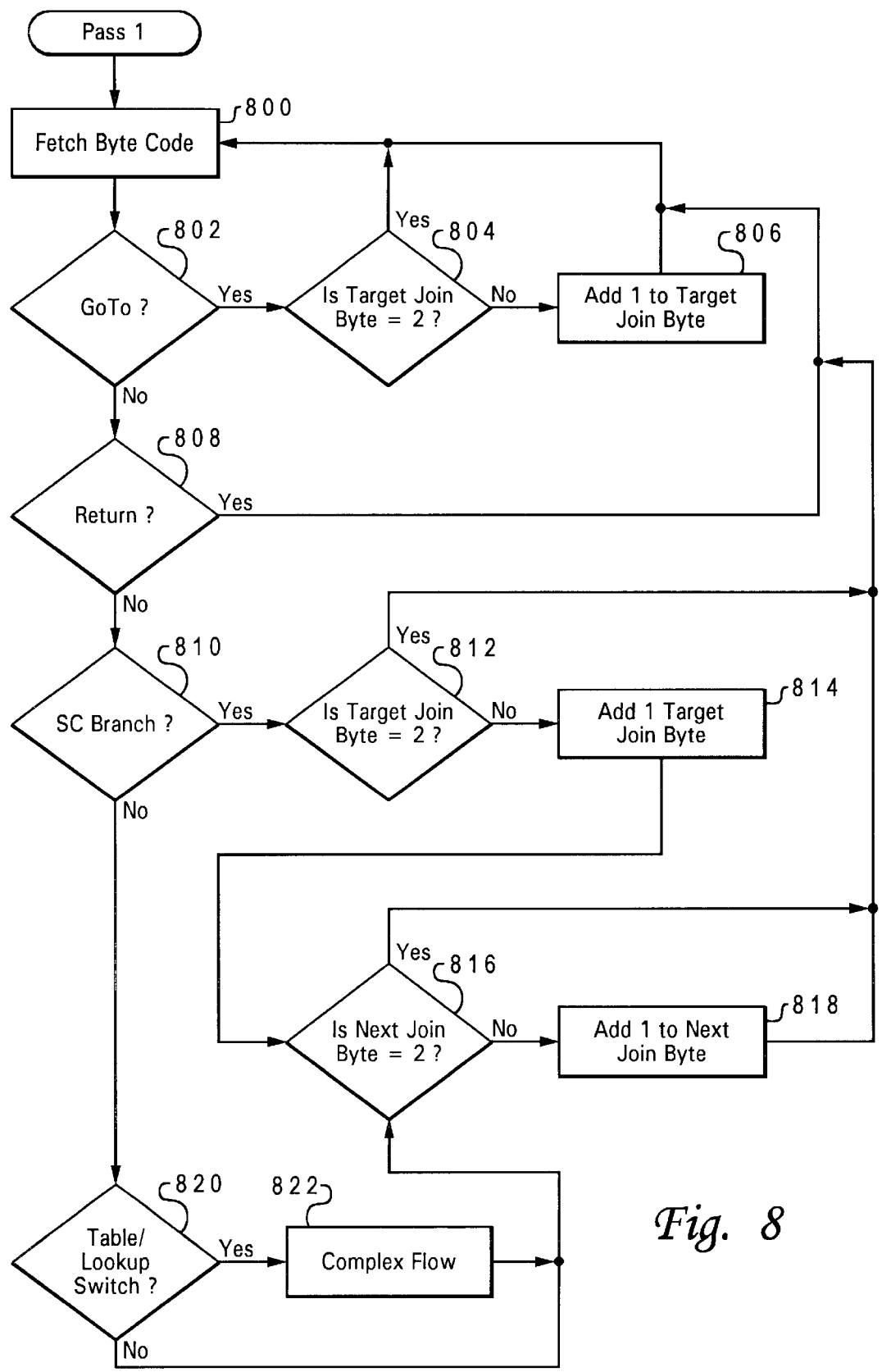
FIG. 8 is a flowchart of a first pass in processing a method in accordance with a preferred embodiment of the present invention.

Turning next to FIG. 8, a flowchart of a first pass in processing a method is depicted in accordance with a preferred embodiment of the present invention. This flowchart is a more detailed illustration of step 708 in FIG. 7. The process begins by fetching a bytecode (step 800). A determination is then made as to whether the bytecode is a goto instruction to a target (step 802). If the bytecode contains a goto instruction, a determination is then made as to whether the target join byte is set equal to two (step 804). The target join byte is the entry in the JIT table for the target bytecode. If a determination is made that the target join byte is equal to two, then the process returns to step 800. Otherwise, one is added to the target join byte (step 806) with the process returning to step 800.

With reference again to step 802, if the bytecode is not a goto instruction, a determination is then made as to whether the bytecode is a return (step 808). If a return is present, no join bytes are then updated, and the process returns to step 800 as described above. Otherwise, a determination is made as to whether the bytecode is a simple condition (SC) branch (step 810). If the bytecode is a SC branch, a determination is then made as to whether the target join byte of the branch is equal to two (step 812). If the target join byte is equal to two, the process returns to step 800. Otherwise, one is added to the target join byte (step 814). Then, a determination is made as to whether the next join byte is equal to two (step 816). If the next join byte is equal to two, the process returns to step 800. Otherwise, one is added to the next join byte (step 818).

With reference again to step 810, if the bytecode is not a SC branch, a determination is then made as to whether the bytecode is a table/lookup switch (step 820). If the bytecode is a table/lookup switch, complex flow processing is performed (step 822) with the process then proceeding to step 816, as described above. If the bytecode is not a table/lookup switch, the process proceeds directly to step 816.

Figure 9:
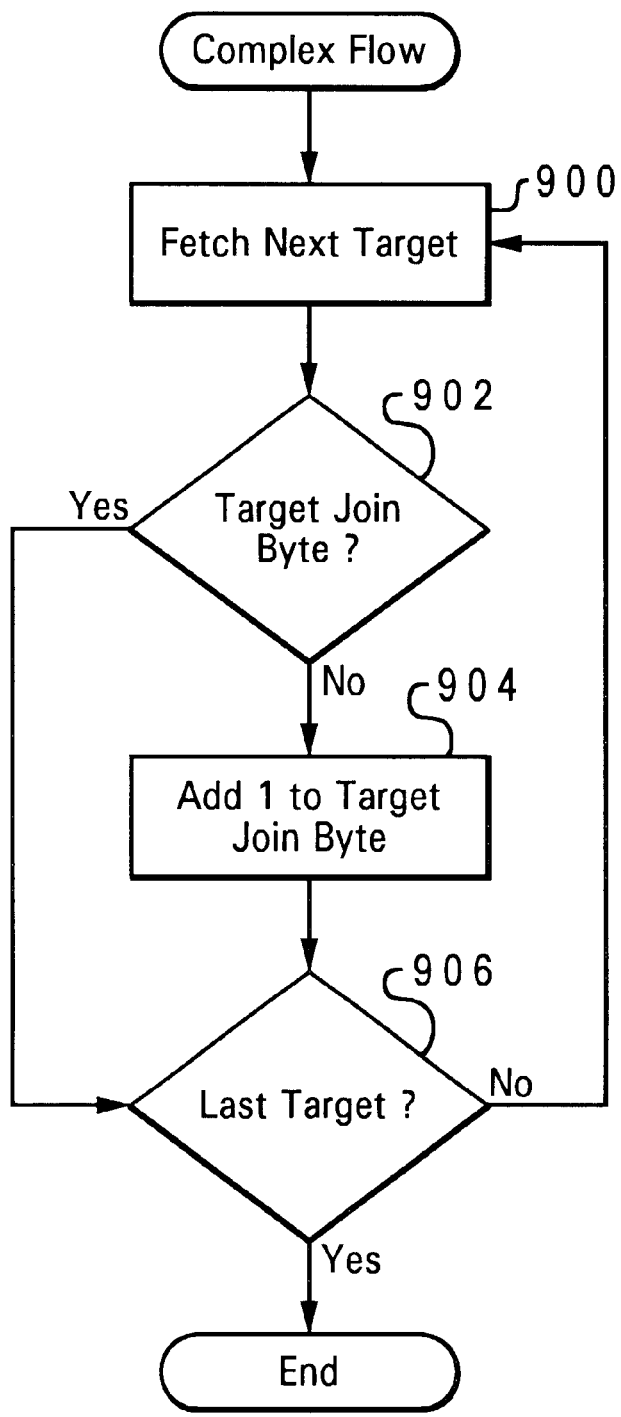
FIG. 9 is a flowchart of a process for performing a second pass in processing a method in accordance with a preferred embodiment of the present invention.

Turning now to FIG. 9, a flowchart of a process for complex flow processing is depicted in accordance with a preferred embodiment of the present invention. FIG. 9 is a more detailed description of step 822 in FIG. 8. The process begins by fetching the next target (step 900). Thereafter, a determination is made as to whether the target is a join byte (step 902). If the target is not a join byte, one is added to the target join byte (step 904). A determination is made as to whether the target is the last target (step 906). If the target is the last target, the process returns to step 900. Otherwise, the process terminates. The process proceeds directly to step 906 from step 902 if the target is a join byte.

Figure 10:
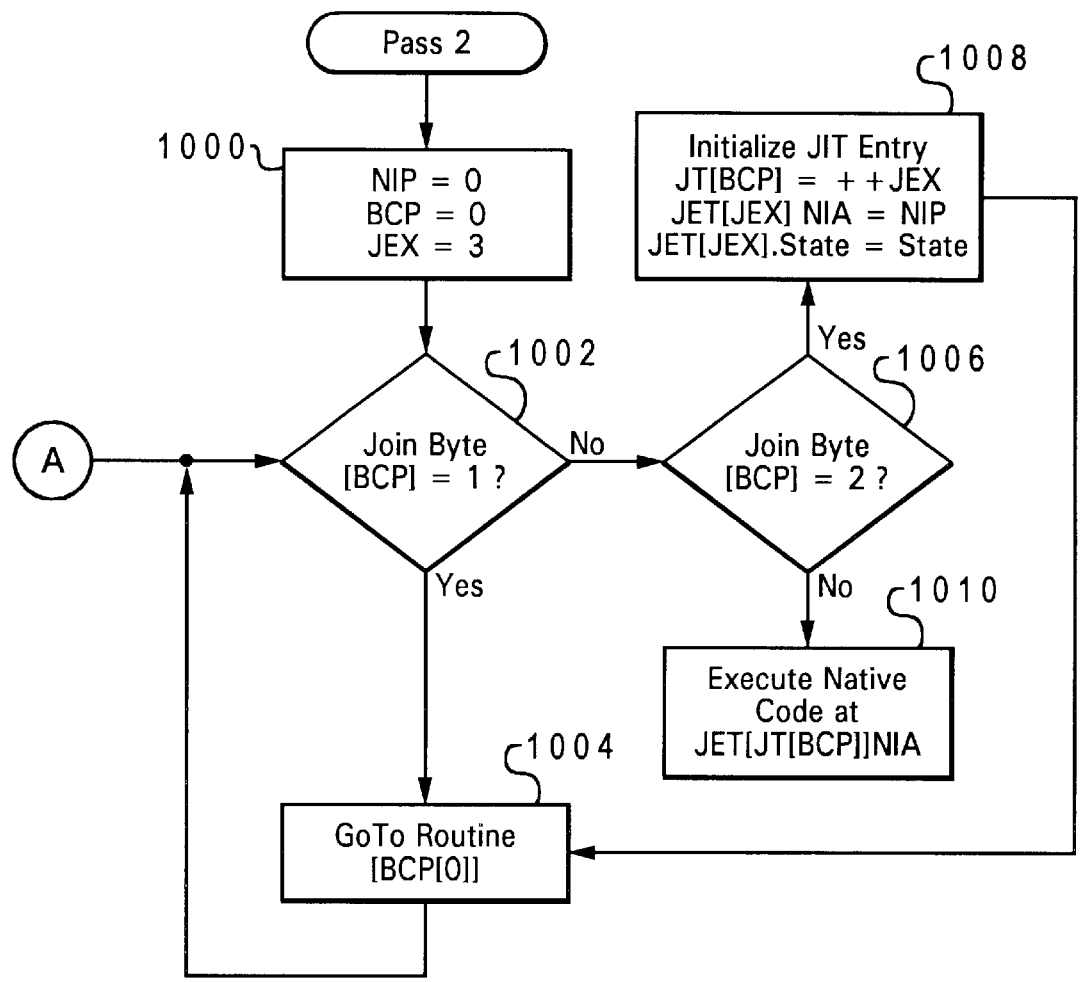
FIG. 10 is a flowchart of a process for compiling bytecodes in accordance with a preferred embodiment of the present invention.

Turning next to FIG. 10, a flowchart of a process for performing a second pass in processing a method is depicted in accordance with a preferred embodiment of the present invention. FIG. 10 is a more detailed illustration of step 710 in FIG. 7. The process begins by setting the native instruction-pointer (NIP) equal to zero, setting bytecode pointer (BCP) equal to zero, and setting JEX equal to zero (step 1000). JEX is defined by the pointer index to the next available join table entry. A determination is made as to whether join byte[BCP] is equal to one (step 1002). If join byte[BCP] is equal to one, then the process goes to the routine[BCP(0)] that handles that bytecode (step 1004). Step 1004 is a compilation step that will be described in more detail below in FIG. 11 with the process then returning to step 1002. If the join byte[BCP] is not equal to one, the process then determines whether join byte[BCP] is equal to two (step 1006). If join byte[BCP] is equal to two, then the process allocates a join table entry setting JT[BCP] to the index of that entry and initializes that entry by setting the PSI address to point to the next instruction pointer.

With reference again to step 1006, if join byte[BCP] is greater than two, the join byte is an index into the join table and the join table entry at that index has the PSI address and native state required to pass control to the PSI address(step 1010).

Figure 11:
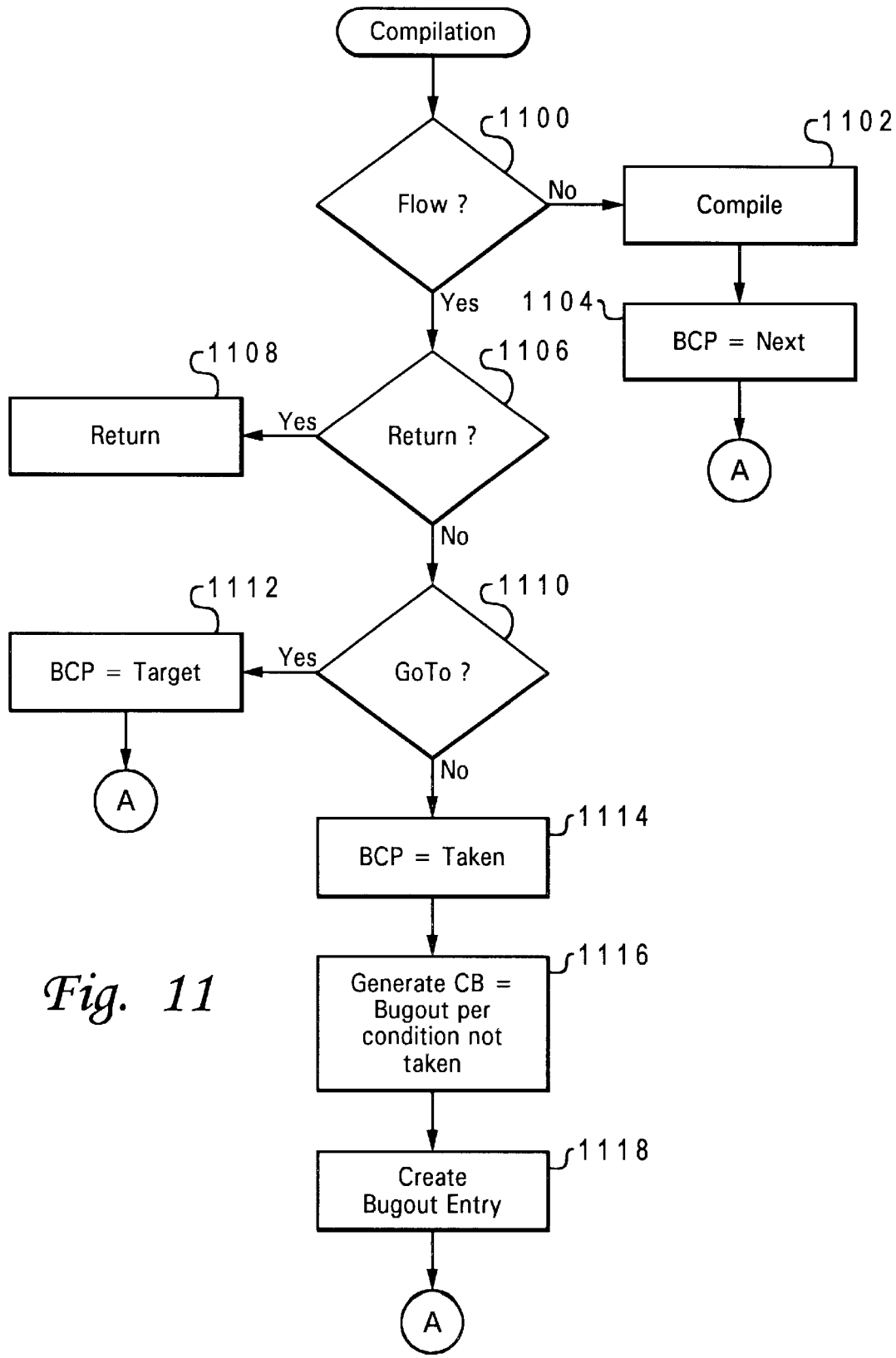
FIG. 11 is a flowchart of a return process in accordance with a preferred embodiment of the present invention.

Turning now to FIG. 11, a flowchart of a process for compiling bytecodes is depicted in accordance with a preferred embodiment of the present invention. FIG. 11 is a more detailed illustration of step 1004 in FIG. 10. The process begins by determining whether the bytecode is a flow altering bytecode (step 1100). If the bytecode is not a flow, the process then compiles the bytecode (step 1002) and sets BCP equal to Next (step 1104) with the process then returning to step 1002 in FIG. 10.

If the process determines that the bytecode is a flow altering bytecode, then the process determines if the bytecode is a return (step 1106). If the bytecode is a return, then return processing is performed (step 1108). Otherwise, a determination is made as to whether the bytecode is a goto (step 1110). If the bytecode is a goto, the BCP is set equal to the target of the goto statement (step 1112) with the process then returning to step 1002 in FIG. 10. Otherwise, a conditional branch exists and BCP is set equal to the path taken (step 1114). In the depicted example, taken is the bytecode that will be next executed as a result of a conditional branch. Thereafter, a conditional branch (CB) is generated for the condition not taken in which CB is equal to bugout for the condition not taken (step 1116). Next, a bugout entry is created in bugout table 420 in FIG. 4 (step 1118) with the process then returning to step 1002 in FIG. 10. The bugout entry will include the PSI address of the branch, the bytecode address, and compilation state information.

Figure 12:
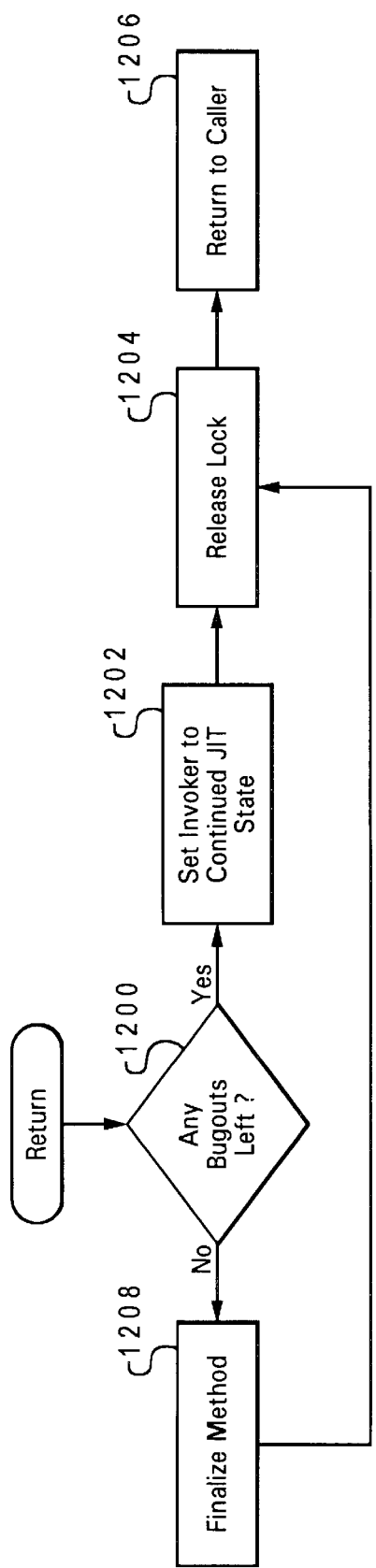
FIG. 12 is a flowchart of a time out process in accordance with a preferred embodiment of the present invention.

Turning now to FIG. 12, a flowchart of a return process is depicted in accordance with a preferred embodiment of the present invention. FIG. 12 is a more detailed flowchart of step 1108 in FIG. 11. The process begins by determining whether any bugouts are still present (step 1200). If bugouts are still present, the invoker is set to a continued JIT state. (step 1202).

If the JIT station is available, the invoker is placed in a state to setup and pass control to the JIT station to continue compiling the bytecodes. If the JIT station is unavailable, the invoker is placed in a state to pass control to the interpreter/compiler. Then, the lock on the JIT station is released (step 1204). Then, the process returns to caller (step 1206). With reference again to step 1200, if no bugouts are left, the method is finalized (step 1208) with the process then proceeding to step 1204 as previously described. In finalizing, the conditional branch to the bugout handler is changed to an address to continue execution at the interpreter with the bytecode pointer set to the address of the target bytecode.

Figure 13:
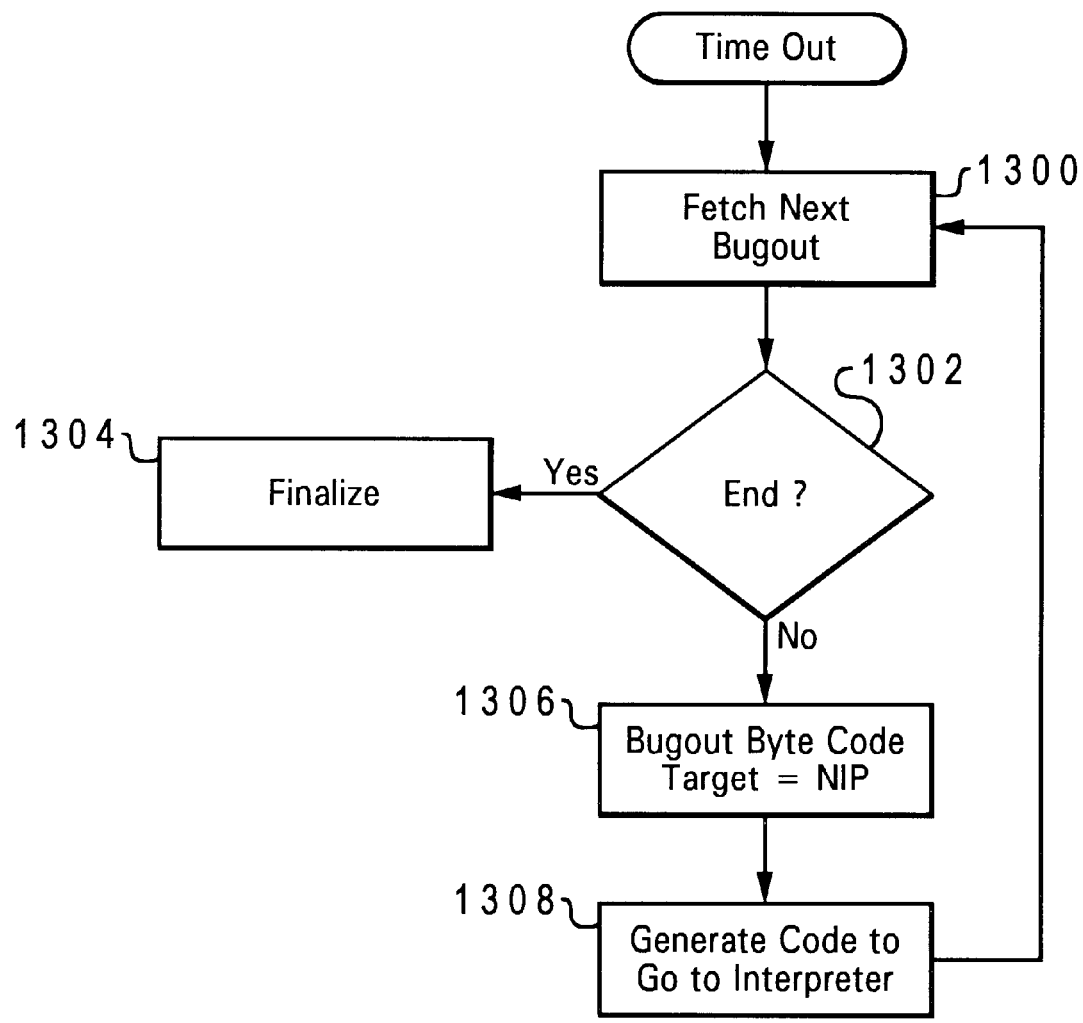
FIG. 13 is a flowchart of a process for complex flow processing in accordance with a preferred embodiment of the present invention.

With reference now to FIG. 13, a flowchart of a time out process is depicted in accordance with a preferred embodiment of the present invention. The time out process is used when another method needs to use the JIT station and the current owner s allotted time for the JIT station has elapsed. The process begins by fetching the next bugout entry from bugout table 420 in FIG. 4 (step 1300). A determination is made as to whether the end of the bugout table has been reached (step 1302). If the end of the bugout table has been reached, the method is then finalized (step 1304). With reference again to step 1302, if the end of the bugout table has not been reached, bugout bytecode for the target is set equal to NIP (step 1306). Thereafter, code is generated to enter or goto the interpreter (step 1308). In this step, code is generated to set up BCP that is needed to go back to and restore the interpreter state in the invoker with the process then returning to step 1300.

The present invention thus provides an improved method and apparatus for compiling and interpreting bytecodes.

This advantage is provided through performing compilation as a method is being interpreted. In particular, only paths that are actually being executed are being compiled or jitted. Additionally, the present invention allows for a path that has been compiled into native machine code to be used during the same invocation during which compilation is being performed. For example, if a method has a loop that is executed numerous times, the bytecode will be compiled into native code during the first iteration. During subsequent iterations, the native machine code will be executed. Additionally, under the present invention when native machine code hits a flow control instruction, (a condition branch) that directs it to non-jitted code, control is passed to a temporary step which reestablishes the state required to continue interpretation/jitting.

Thus, the present invention also allows for methods to be partially compiled, leaving infrequently executed paths in bytecode form, reducing storage use. The present invention also provides an advantage in that cache efficiency is improved with the laying out of code in storage in the order that it is executed.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. For example, although the embodiment illustrated is directed towards processing Java bytecodes, the present invention may be applied to other types of languages. For example, the processes of the present invention may be applied to real time translation from one environment to another environment. The embodiment was chosen and described in order to best explain the principles of the invention the practical application to enable others of ordinary skill in the art to understand the invention for various embodiments with various modifications as are suited to the particular use contemplated.

What is claimed is:

1. A process in a data processing system for executing a method having a plurality of paths, wherein the data processing system executes native machine code, the process comprising:
   identifying a path being executed, wherein the path is one of the plurality of paths in the within the method and wherein a plurality of bytecodes are associated with the path; and
   compiling bytecodes for the path being executed, wherein the bytecodes are compiled into native machine code executed by the data processing system, wherein bytecodes for unexecuted paths within the method remain uncompiled.

2. The process of claim 1 further comprising:
   executing native machine code for a path in response to a loop back through the path during execution of the method.

3. The process of claim 1, wherein compiled instructions for the path are executed in an order and wherein the compiled instructions are stored in execution order.

4. The process claim 1, wherein a JIT station is used in compiling the method.

5. The process of claim 1, wherein a data structure is used during compiling of the method to store information about a path as the path is compiled.

6. The process of claim 5, wherein the data structure stores the native machine code.

7. The process of claim 6, wherein the data structure is a JIT station.

8. A process in a data processing system for executing a method having a plurality of paths in which each path within the plurality of paths contains a number of bytecodes, the method comprising:
   identifying the method that is to be executed; and
   compiling the bytecodes into instructions for execution by the data processing system for each path within the plurality of paths as each path is executed.

9. The process of claim 8, wherein unexecuted paths within the plurality of paths remain in a bytecode form.

10. The process of claim 8, wherein the instructions have an execution order and further comprising:
    storing the instructions in the execution order.

11. The process of claim 8 further comprising:
    executing the instructions for a path within the plurality of paths in response to a loop back through the path during compilation of the method.

12. The process of claim 8, wherein a data structure is used during compiling of the method to store information about a path as the path is compiled.

13. The process of claim 12, wherein the data structure stores the instructions.
    compilation means for compiling bytecodes for the path being executed, wherein the bytecodes are compiled into native machine code, wherein bytecodes for unexecuted paths remain uncompiled.

14. A data processing system for executing a method having a plurality of paths, wherein the data processing system executes native machine code, the data processing system comprising:
    identification means for identifying a path being executed, wherein the path is one of the plurality of paths in the method and wherein a plurality of bytecodes are associated with the path; and
    compilation means for compiling bytecodes for the path being executed, wherein the bytecodes are compiled into native machine code, wherein bytecodes for unexecuted paths within the method remain uncompiled.

15. The data processing system of claim 14 further comprising:
    execution means for executing native machine code for a path in response to a loop back through the path during interpreting of the method.

16. The data processing system of claim 14, wherein compiled instructions for the path are executed in an order and wherein the compiled instructions are stored in the execution order.

17. The data processing system of claim 14, wherein a JIT station is used in compiling the method.

18. The data processing system of claim 14, wherein a data structure is used during compiling of the method to store information about a path as the path is compiled.

19. The data processing system of claim 18, wherein the data structure stores the native machine code.

20. The data processing system of claim 19, wherein the data structure is a JET station.

21. A data processing system comprising:

a method having a plurality of paths in which each path within the plurality of paths contains a number of bytecodes;

identification means for identifying that the method is to be executed; and compilation means for compiling the bytecodes into instructions for execution by the data processing system for each path within the plurality of paths as each path is executed.

22. The data processing system of claim 21, wherein unexecuted paths within the plurality of paths remain in a bytecode form.

23. The data processing system of claim 21, wherein the instructions have an execution order and further comprising:

storing means for storing the instructions in the execution order.

24. The data processing system of claim 21 further comprising:

execution means for executing the instructions for a path within the plurality of paths in response to a loop back through the path during compilation of the method.

25. The data processing system of claim 21, wherein a data structure is used during compiling of the method to store information about a path as the path is compiled.

26. The data processing system of claim 25, wherein the data structure stores the instructions.

27. A computer program product for executing a method in a data processing system, wherein the method has a plurality of paths in which each path with in the plurality of paths contains a number of bytecodes, the computer program product comprising:

first instructions for identifying that the method is to be executed; and second instructions for compiling the bytecodes into compiled instructions for execution by the data processing system for each path within the plurality of paths as each path is executed.

28. The computer program product of claim 27, wherein the compiled instructions have an execution order and further comprising:

third instructions for storing the compiled instructions in the execution order.

29. The method of claim 27 further comprising:

third instructions for executing the compiled instructions for the path within the plurality of paths in response to a loop back through the path during compilation of the method.

* * * * *

UNITED STATES PATENT AND TRADEMARK OFFICE
CERTIFICATE OF CORRECTION

| | | |
|---|---|---|
| PATENT NO. | : 6,792,600 B1 | Page 1 of 1 |
| APPLICATION NO. | : 09/078933 | |
| DATED | : September 14, 2004 | |
| INVENTOR(S) | : Blandy | |

It is certified that error appears in the above-identified patent and that said Letters Patent is hereby corrected as shown below:

Col. 11, line 2: after "structure is a" delete "JET" and insert --JIT--.

Col. 12, line 19: after "29. The" delete "method" and insert --computer program product--.

Signed and Sealed this

Tenth Day of October, 2006

JON W. DUDAS
*Director of the United States Patent and Trademark Office*